March 9, 1965  H. G. JOHNSON  3,172,928
METHOD FOR DEEP FORMING FLUOROCARBON POLYMER SHEET MATERIAL
Filed Aug. 8, 1961  2 Sheets-Sheet 1
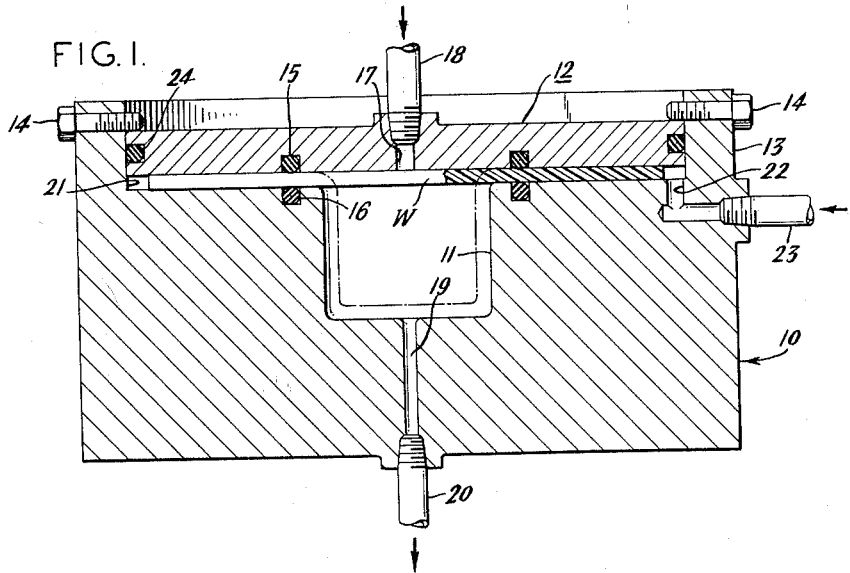
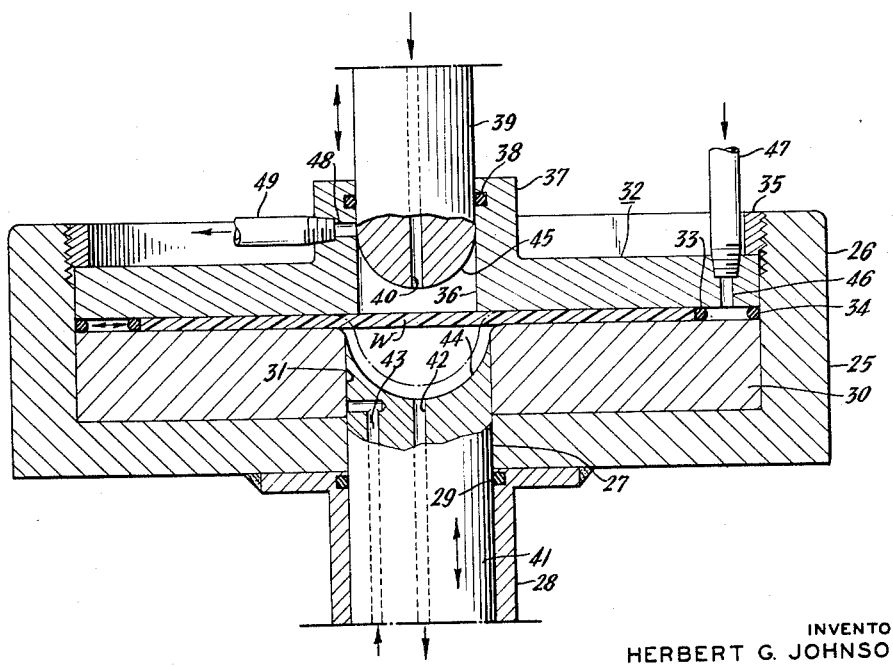
INVENTOR:
HERBERT G. JOHNSON
BY
Howson & Howson
ATTYS.

March 9, 1965 H. G. JOHNSON 3,172,928
METHOD FOR DEEP FORMING FLUOROCARBON POLYMER SHEET MATERIAL
Filed Aug. 8, 1961 2 Sheets-Sheet 2

INVENTOR:
HERBERT G. JOHNSON
BY
Howson & Howson
ATTYS.

United States Patent Office 3,172,928
Patented Mar. 9, 1965

3,172,928
METHOD FOR DEEP FORMING FLUOROCAR-
BON POLYMER SHEET MATERIAL
Herbert G. Johnson, Havertown, Pa., assignor to Ray-
bestos-Manhattan, Inc., Manheim, Pa., a corporation of
New Jersey
Filed Aug. 8, 1961, Ser. No. 130,149
26 Claims. (Cl. 264—93)

This invention relates to fabricating parts from fluorocarbon polymer sheet material, and more particularly to forming such parts by a novel method involving deep forming fluorocarbon polymer sheet material.

Fabricated shapes of fluorocarbon polymers, such as polytetrafluoroethylene, are tough, flexible in thin sections, and fairly rigid in thick sections. These polymers maintain useful mechanical properties from $-450°$ F. to $500°$ F. Surfaces of parts fabricated from such polymers have an extremely low coefficient of friction. Flurocarbon polymers are almost chemically inert. Because of these desirable physical and chemical properties, fluorocarbon polymers have found many uses. For example, in chemical equipment applications it has been considered desirable to line pipes for handling corrosive chemicals with fluorocarbon polymer. However, it has been exceedingly difficult to provide an entire system of metal piping comprising T-fittings, L-fittings, crosses, couplings and the like, valves, pumps, etc., which is completely lined with fluorocarbon polymer, because of the difficulty in fabricating these parts from such polymeric material.

Fluorocarbon polymers cannot be processed in conventional plastic molding and extruding equipment since these polymers do not melt and flow as do most commonly used thermoplastic resins, nor do they flow and "set up" with heat like thermosetting resins.

The term "fluorocarbon polymer" as used in this specification and claims means polymers and copolymers of tetrafluoroethylene having a high degree of polymerization, a sintering temperature above $575°$ F., and which above the sintering temperature form a gel but do not actually melt to a liquid. Thus, this term includes polytetrafluoroethylene (i.e. the tetrafluoroethylene homopolymer), and tetrafluoroethylene copolymers comprising the polymerization product of a mixture of tetrafluoroethylene and another unsaturated organic compound (e.g. ethylene and chlorotrifluoroethylene) containing a terminal ethylenic double bond, the other organic compound being copolymerizable with tetrafluoroethylene and being present in the mixture up to about 15% of the combined weight of tetrafluoroethylene and the organic compound. Also, the term includes tetrafluoroethylene polymers in which the end groups of the polymer chain are supplied by non-polymerizable compounds (e.g. methanol and ethanol) which are present during the reaction.

It is an object of the present invention to provide a novel method for deep forming fluorocarbon polymer sheet by means of a pressure fluid applied in such manner that the polymeric sheet material is shaped without reducing the thickness of the sheet.

Another object of this invention is the provision of a method for making seamless branched fittings, such as T-fittings and the like, involving the use of endwise pressure applied to both ends of a tubular blank of fluorocarbon polymer sheet with coordinated pressure within the blank.

A further object of the present invention is to provide an improved method for making deep shaped parts from fluorocarbon polymer sheet by applying in a coordinated manner fluid pressure acting radially inward on the sheet to cause said sheet to flow into a die cavity while applying fluid pressure on the sheet in the direction of the die cavity.

Still another object of this invention is the provision of a method for providing metal branch fittings, such as T-fittings and the like, with a seamless lining of fluorocarbon polymer sheet.

These and other objects of this invention will become further apparent from a consideration of this specification, drawings and claims.

The novel method according to this invention for deep forming fluorocarbon polymer sheet broadly comprises supporting a fluorocarbon polymer sheet in a die having a recessed portion with said sheet extending across the mouth of said recessed portion, and applying pressure or force to the surface of said sheet in a direction substantially normal to the mouth of said recessed portion of said die and concurrently to the edge of said sheet to flow said sheet into said recessed portion of said die.

Preferably the sheet is heated to a temperature in the range between about $475°$ and $625°$ F. to produce the minimum yield point in compression during application of forming pressure in excess of that providing permanent deformation and at the completion of the forming operation the piece is rapidly cooled or quenched in the die and under pressure to a temperature below about $100°$ F. Subsequently the shape so formed is reheated slowly while supported against deformation, as for example in the forming apparatus, to preferably a temperature of at least $100°$ F. above the anticipated working temperature of the article, but not appreciably above the gel point of $625°$ F. Finally the shaped article while still supported is slowly cooled to ambient temperature. The article then may be removed from its support, being relieved of forming stresses and stabilized within its working temperature range.

It was discovered that by carrying out the above method stable deep formed parts of fluorocarbon polymer sheet may be obtained without any substantial thinning of the sheet in the deep shaped portion thereof, or any appreciable loss of its physical properties.

By "deep" forming without substantial thinning is meant producing in a fluorocarbon polymer sheet one or more cavities or protrudances which have depth or height of 25% or more of the width at base, and which depth or height is more than 500% of the thickness of the original sheet, while the sheet substantially uniformly retains a minimum of 75% of the original thickness.

By the term "sheet" as used in this specification and appended claims is meant a body of fluorocarbon polymer of large surface area as compared to the thickness thereof. Preferably, such a sheet will have a thickness of ¼" or less. Such a sheet may be relatively flat, or in seamless tubular form as obtained by paste extrusion of fluorocarbon polymer. Other forms of sheet which may be deep formed according to this invention will be readily apparent to persons skilled in the art.

The invention will be clearly understood in connection with the accompanying drawings, in which:

FIGURE 1 is a central axial section, partly diagrammatic in nature, of one embodiment of a die for forming deep shaped fluorocarbon polymer polymer parts by means of fluid pressure according to the method of this invention.

FIGURE 2 is a central axial section of a preferred form of apparatus according to this invention for forming deep shaped fluorocarbon polymer parts by means of fluid and mechanical pressure.

Figure 3:
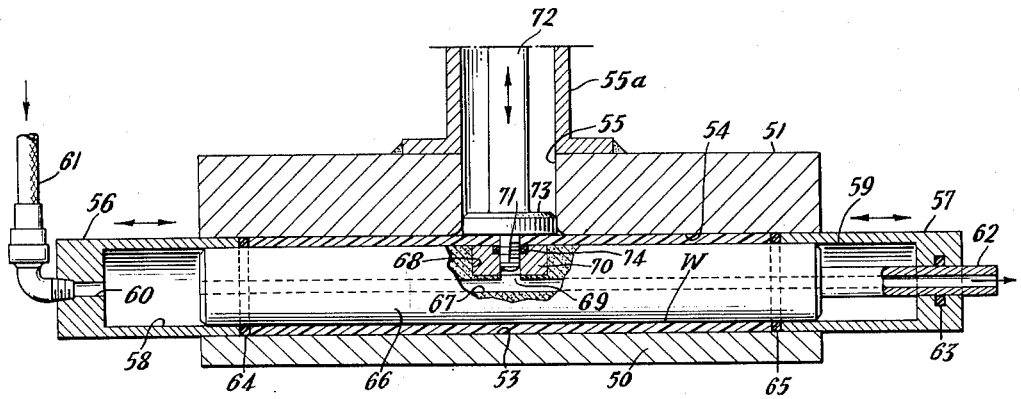
FIGURE 3 is an axial section of a preferred form of apparatus of this invention showing sheet fluorocarbon polymer in tubular form in position in a pair of dies having opposing punches for the deep forming operation.

As shown in FIG. 1, a blank or work piece W of fluorocarbon polymer in the form of a flat sheet, which is to be provided with a deep-formed, cup-shaped depression, is placed in a die 10 having a central recess 11, which die 10 may be closed by a cover 12. Die 10 is equipped with a centralization shoulder 13, which shoulder engages the periphery of cover 12. The cover 12 is secured to the die by a plurality of screws 14 disposed in threaded holes in shoulder 13. Die 10 and cover 12 closely confine the edges of the blank W in an annular zone around the circumference to keep the blank from buckling. Sealing means such as rubber O-rings 15 and 16 in grooves located at a radial distance within the outer periphery of the annular zone insure the sealing of the edge around its circumference for the full range of inward movement of the outer periphery of the work piece. The die and cover surfaces are preferably ground smooth for easy slippage of the blank between them, and the rim and the juncture between the side walls and bottom of the depression 11 are rounded for smooth flow of the blank about them.

The cover 12 is equipped with a channel 17 for threadedly engaging pressure pipe 18, and the die 10 equipped with a similar channel 19 which is connected to a pipe 20. Pipe 18, which may be closed by valve means, leads to a hydraulic pressure pump, not shown. Similarly, pipe 20, which may be closed by valve means, leads to a vacuum pump, not shown. Although the use of a vacuum pump is preferred, channel 19 or line 20 may merely vent to the atmosphere.

The work piece which is to be deep formed should have a smaller diameter than the diameter of the die 10, measured at the inside wall of shoulder 13, so that when the work piece is centered in the die and the cover applied there is a circumferential cavity 21 to receive fluid pressure, as from a channel 22 and pipe 23. Pipe 23, which may be closed by valve means, leads to a hydraulic pressure pump, not shown.

Cover 12 is provided with a sealing ring 24 to prevent fluid pressure loss between the outer peripheral edge of the cover and the inner wall of shoulder 13 of die 10.

The work piece comprises a disc of fluorocarbon polymer which may be disposed on the top surface of open die 10. The cover is then centered on top of the work piece and clamped in place by means of screws 14. After this is done pressure fluid is introduced to circumferential cavity 21 through pipe 23 and channel 22. At the same time, pressure fluid is introduced through pipe 18 and channel 17. Also, a vacuum may be created in recess 11 by withdrawing air from the recess through channel 19 and line 20. The pressure fluid may be provided by pumps, pumps with accumulators, and the like. The sheet is pressed into recess 11 through the mentioned combined pressure and vacuum operations. This process is continued until the sheet is pressed firmly against the wall of the recess 11 of die 10 as indicated by the dot and dash line.

In order to minimize the pressure required to cause the fluorocarbon polymer sheet to flow into the recess 11 of die 10, it is preferred to heat the sheet prior to and/or during pressing or forming to a temperature of from about 475° to about 625° F. to produce a minimum yield point in compression. The pressure applied is sufficient to provide permanent deformation at the temperature used. A temperature of about 550° F. is particularly preferred, the yield point at this temperature being only about 500 p.s.i. This may be readily accomplished by heating the die and cover to temperatures in this range prior to or after placing the work piece in the die. Such heating of the die and cover can be accomplished by placing them in an oven maintained at such temperature. Also the die and cover can be provided with electric resistance heating coils or the like for such purpose.

After the sheet has been deep formed, as illustrated in FIG. 1 by the dot and dash line, it is desirable to rapidly chill or quench the sheet to a temperature below about 100° F. to "set" the deep formed portion. This can be accomplished by the use of cooling coils located adjacent the recess 11 in die 10, through which cooling fluid may be circulated after completion of the forming operation. Alternately the pressurizing fluid may be cooled and circulated through the die cavity to cool the sheet by direct contact therewith.

Subsequently the work piece W, while still supported against deformation in the die 10, is reheated slowly to a temperature at least about 100° above the temperature to which the work piece will be subjected in use but not appreciably above 625° F. This reheating may be accomplished by use of heating means employed to heat the polymer during deep forming. Finally the shaped work piece, still supported by die 10, is slowly cooled to ambient temperature.

The pressure fluid preferably comprises a non-toxic, non-flammable heat transfer fluid such as a fluid silicone manufactured by General Electric Company having a boiling point above about 600° F. at atmospheric pressure and a viscosity at 25° C. of about 300 S.S.U. Other pressure fluids suitable for use according to the method of this invention will be readily apparent to those skilled in the art having this disclosure before them.

The deep forming method of this invention illustrated in FIGURE 2, involving novel apparatus of this invention, contemplates the use of mechanical force in conjunction with fluid pressure. This permits forming at room temperature by applying compressive stresses of the order of 4000 p.s.i. to obtain equivalent deformation as obtained in FIG. 1 at 500° F.

Referring to the drawing, FIG. 2, the numeral 25 designates a die holder having an annular side wall 26. Die holder 25 is provided with a central opening 27 and a collar 28 provided with a sealing ring 29. Seated within die holder 25 is a die 30 having a centrally located passage 31 which aligns with the opening 27 of the die holder. A blank or work piece W of fluorocarbon polymer sheet is placed in the die 30, and the die is closed by a cover 32 which rests on die 30 by means of distancing sealing rings 33 and 34, so that the space between the cover and die is slightly larger than the thickness of the work piece W. Die cover 32 is held in place by means of a ring 35 which threadedly engages the upper inner surface of annular side wall 26 of the die holder 25.

Die cover 32 is equipped with a central located opening 36 which is surrounded at its upper end by a collar 37 provided with a sealing ring 38. A deep forming punch 39, which reciprocates in opening 36, is provided with an axial passage 40, which passage is connected to a pressure fluid pipe and source of pressure fluid, not shown. Punch 39 is provided with means for reciprocation, such as a hydraulic motor, not shown.

A tool 41 reciprocates in central opening 27 of die holder 25 and collar 28. This tool is provided with an axial passage 42 and an auxiliary passage 43 which extends through the side wall of tool 41. Passage 42 is connected to a vacuum pump by suitable tubing, not shown. Auxiliary passage 43 is vented to the atmosphere through suitable valve means, not shown. Tool 41 is provided with means for reciprocation, such as a hydraulic motor, not shown.

The diameter of punch 39 is smaller than the diameter of tool 41, the difference in diameters being equal to or just slightly larger than twice the original thickness of the work piece W. The upper end of tool 41 is recessed as indicated at 44, and the lower or inner end of punch 39 is rounded as indicated at 45. Preferably, curved recess 44 and the inner curved end 45 of punch 39 are mated in the sense that the center of curvature for each of these curved surfaces lies in the same line or axis, and the radius of curvature of recess 44 is larger than the radius of curvature of the rounded end 45 of the punch by a distance about equal to or just slightly larger than the thickness of the work piece W.

By means of the above described relation between the punch 39 and the tool 41, there is no tendency for the punch and tool to thin the work piece during the deep forming operation, as hereinafter described.

Die cover 32 is provided with a channel 46 which leads to the annular space between the sealing rings 33 and 34, and threadedly engages a pressure pipe 47. Pipe 47, which may be closed by valve means, leads to a hydraulic pressure pump, not shown. Die cover 32 is also provided with a channel 48 which threadedly engages a pipe 49. Pipe 49 is connected to a pressure fluid reservoir, not shown.

Die cover 32 and die 30 closely confine the edges of the blank W in an annular zone around the circumference to keep the blank from buckling during deep forming.

Operation of the apparatus of FIG. 2 is as follows. After the work piece W has been properly seated in the die and the die cover applied, punch 39 and tool 41 are moved to the respective positions illustrated in the drawing. Punch 39 is then moved downwardly into contact with the work piece. Continued downward movement of punch 39 causes the central portion of work piece W to be drawn into the recess formed by the upper concave, curved end 44 of tool 41. As the punch progresses into this recess, pressure fluid is introduced into the annular space between the sealing rings 33 and 34, thereby subjecting the work piece to radial compression. In addition, pressure fluid is introduced through axial channel 40 in punch 39, and air is withdrawn from the space defined by the work piece and the curved concave surface 44 of tool 41. At this time the valve in the line to which channel 43 is connected is closed.

Punch 39 continues its downward progress until finally the central portion of the work piece is confined between the convex curved surface 45 of punch 39 and the concave curved surface 44 of tool 41, as indicated by the dotted lines. During this downward movement of the punch pressure fluid is continually introduced through pipe 47 and channel 40. The pressure fluid introduced against the central portion of the work piece through channel 40 is removed in controlled fashion through channel 48 and pipe 49.

After the punch 39 reaches the position indicated by the dotted lines, as it continues its downward progress tool 41 is withdrawn at the same rate punch 30 is advanced, whereby the work piece is closely confined between and supported by the punch and tool, as well as the die, during further deep forming. Movement of the punch and tool are continued until the desired depth of draw is obtained.

Preferably the entire operation is carried out at elevated temperatures between about 475° and 625° F., followed by quenching, reheating and slow cooling as described with reference to the operation of the apparatus of FIG. 1. During these heating and cooling operations, the work piece is supported by the punch, tool, die and die cover. Heating and cooling can be effected by heating or cooling the pressure fluid introduced through channel 40. Additional heating or cooling can be obtained by opening the valve in the line to which channel 43 is connected and circulating heated or cooled air through this channel, across the face of the work piece and out channel 42.

The apparatus of FIG. 2 is particularly useful in forming extra deep cavities with uniformly substantially unthinned walls, as in the conversion of a flat sheet into a long, closed end tube, for the apparatus provides support for the work piece at all points at all times during the deep forming and subsequent heat treatment operations.

The apparatus of FIG. 2, although particularly suited for deep forming fluorocarbon polymer sheet, may be used to deep form other sheet material. The temperatures and pressures employed will depend upon the physical characteristics of the material to be deep formed.

Figure 4:
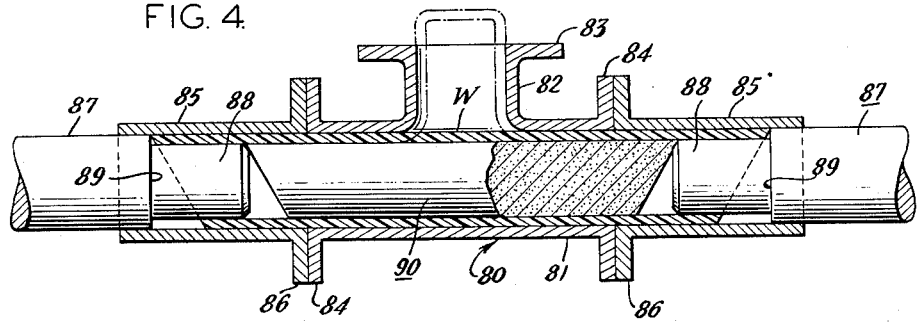
FIGURE 4 is an axial section showing sheet fluorocarbon polymer in tubular form with tapered ends in a metal pipe T which is to be lined with the fluorocarbon polymer sheet and which acts as the die during an essentially mechanical deep forming operation.
Figure 5:
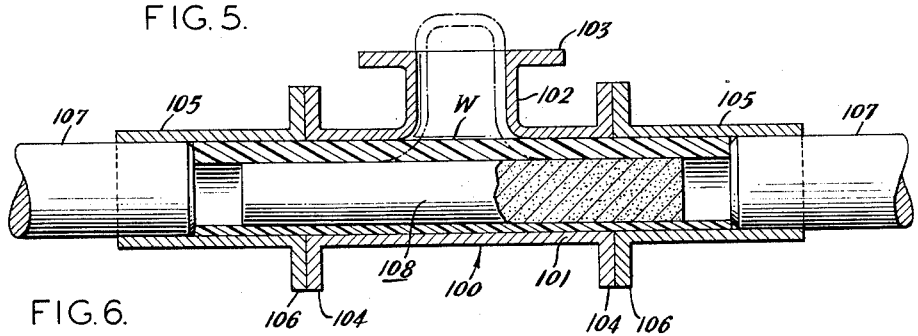
FIGURE 5 is similar to FIG. 3, illustrating the initial step in deep forming a cylindrical fluorocarbon polymer sheet of variable thickness in a T lining for a pipe T.

In addition to producing deep shaped objects from relatively flat sheets of fluorocarbon polymer as described with reference to FIGS. 1 and 2, the method of this invention makes possible deep forming of sheets of such polymer in tubular or other form to obtain various shapes, such as T's and crosses, from fluorocarbon polymer sheet. Application of the method of the invention to deep forming of tubular sheets is illustrated in FIGURES 3–5.

Referring to FIGURE 3, there is illustrated a split die having a lower half 50 and an upper half 51. The lower die half 50 comprises a rectangular metal block, such as steel, across the top of which is positioned a semi-circular groove or depression 53. The upper half 51 of the split die is likewise a rectangular block, and in its lower face it carries a semi-circular groove or depression 54, which matches with the groove 53 in the block 50, to provide a cylindrical hole through the length of the composite die. At a mid-position in the length of the block 51, a cylindrical hole 55 extends upwardly from the groove 54 to the top of the block 51. Aligned with hole 55 and extending upwardly therefrom is a collar 55a. Hole 55 and collar 55a constitute the negative imprint of the T that is to be formed from the tubular fluorocarbon polymer sheet. Their diameter is determined by the desired diameter of the neck of the T to be formed, and as illustrated is the same diameter as the diameter of the cylindrical passage defined by grooves 53 and 54.

The line of juncture between the hole 55 and the groove 54 should be rounded for proper, smooth flow of fluorocarbon polymer sheet during the deep forming operation.

Blocks 50 and 51 of which the split die is composed may be securely held together by bolts or the like, not shown.

Aligned axially with the cylindrical hole provided by the matched die halves are a pair of hydraulic rams or plungers 56 and 57. These plungers are activated by suitable well known means, such as hydraulic pistons, to move toward each other at the same controlled speeds. Throughout the major portion of their lengths the rams have an outside diameter just sufficiently smaller than the internal diameter of the cylindrical hole through the assembled die to permit their sliding therein. At the inner ends of each of the rams 56 and 57 recessed portions defined by side walls 58 and 59, respectively. The thickness of side walls 58 and 59 is such as to provide a substantial end surface for engaging the opposite ends of the work piece. Preferably, these walls have a thickness which is approximately that of the work piece.

Ram 56 is provided with a fluid passage or channel 60 which threadedly engages the coupling of a flexible pressure fluid pipe 61. Fluid pressure pipe 61 is connected to a source of pressure fluid, such as a pump, not shown.

Extending axially of ram 57 is a tube 62 which remains fixed during the deep forming operation, i.e. it does not advance with ram 57. As illustrated in the drawings, tube 62 can take the form of an extension on mandrel 66. A tight seal is obtained between ram 57 and tube 62, as the ram is reciprocated, by means of an O-ring 63.

Tube 62 may be connected through suitable piping to a source of fluid pressure, such as a pump. It is also capable of being vented to the atmosphere through suitable valve means, not shown, to permit filling of the interior of the tubular work piece with pressure fluid as hereinafter described.

Between each of rams 56 and 57 and the corresponding end of the work piece are O-rings or annular seals 64 and 65, respectively. These seals prevent escape of pressure fluid during the deep forming operations.

Located within the tubular work piece is a mandrel 66, the outside diameter of which is only slightly smaller than the inside diameter of the work piece to permit it to be inserted into the work piece without any great difficulty. Extending throughout the length of the mandrel 66 is a passage 67 through which pressure fluid may flow.

On the upper side of mandrel 66, and equidistant from the ends thereof is a recess 68 which is connected to passage 67 by opening 69. Seated within recess 68 is a plug 70 which receives and threadedly engages stem 71 located axially of reciprocatable plunger 72. Stem 71 extends through a hole cut in the work piece, and the work piece is clamped between plug 70 and annular flange 73 at the lower end of plunger 72. A fluid tight seal is maintained between plug 70 and the work piece by means of annular seal or O-ring 74. Plunger 74 is activated by suitable means such as a hydraulic motor, not shown.

The apparatus thus described embodying the method of this invention is used to manufacture T's of tubular fluorocarbon polymer sheet in the following manner.

The tubular blank or work piece of fluorocarbon polymer sheet is straight and open at both ends, and preferably is obtained from a length of standard, paste-extruded, sintered polymer tubing. The ends of the blank are squared off and a small hole is made in one wall of the blank at that point which is to become the center of the deep formed portion. The size of this hole is just sufficient to receive threaded stem 71 of plunger 72.

The mandrel 66 is inserted in the tubular blank with the plug 70 located below the hole in the wall of the tubular blank, and the tubular blank is positioned in groove 53 of the lower die half 50. The blank is centered in groove 53 with the hole, beneath which is plug 70, at the top. The upper die half 51 is now assembled with lower die half 50 so that the axis of the hole in the side wall of the work piece is centered along the axis of hole 55. Plunger 68 is advanced into hole 55 and stem 71 passes through the hole in the side of the work piece and threadedly engages plug 70 to clasp the tubular work piece tightly to form a fluid tight connection.

After the tubular blank has been heated to deep form temperatures of about 475°–625° F., rams 56 and 57 are advanced inwardly at the same speed, and the ends of walls 58 and 59 engage the respective ends of the tubular blank. Pressure fluid is introduced into the interior of the tubular blank through either channel 60, and air is vented from the blank through tube 62. After air has thus been vented, fluid pressure within the blank is built up.

The rams 56 and 57 continue their advance toward each other. In so doing they force the ends of the tubular blank inwardly. At the same time plunger 72 is retracted in hole 55. As plunger 72 is retracted pressure fluid flows into recess 68 through opening 69, and as the plunger is further retracted this fluid exerts form-maintaining pressure on the inside wall of the deep formed portion in opening 55. The combination of mechanical force caused by the action of rams 56, 57 and 72 and fluid pressure within the tubular blank results in flow of polymer sheet into hole 55. The above-described action of the rams is continued until the neck of the T thereby formed is of the desired height.

When this point is reached, the heat treatment operations (quenching and tempering) referred to with respect to FIG. 1 are now carried out. When this treatment has been completed, the direction of movement of rams 56 and 57 is reversed, and they are withdrawing from the die assembly while permitting pressure fluid to flow to the interior of the work piece under substantially reduced pressure to fill the space vacated by the rams. After the plungers 56 and 57 are completely withdrawn, delivery of pressure fluid to the work piece is ceased, and the plunger 72 is separated from the plug 70. The die halves are separated and the formed T removed and subjected to further finishing operations, as for example, providing the neck with the desired size opening.

FIGURES 4 and 5 illustrate the lining of tubular metal branch fittings, such as T-fittings, with fluorocarbon polymer sheet. Although there is substantially no thinning of the fluorocarbon polymer sheet of ordinary thickness up to ¼" in the methods illustrated in FIGS. 1–3, any tendency for thinning of heavy gauge sheet polymer can be minimized by the methods employed as illustrated by FIGS. 4 and 5.

Referring to FIGURE 4, there is shown a metal T-fitting 80 having a cylindrical body portion 81 and a cylindrical neck or branch portion 82 of substantially the same diameter as the body portion. The exterior ends of both the neck and body portions are provided with flanges 83 and 84, respectively.

Axially aligned at each end of the cylindrical body portion are a pair of sleeves 85, each having a flange 86 which abuts on a flange 84 of the T-fitting. The sleeves may be secured to the T-fitting by any suitable means, such as bolts, not shown. The inside diameter of the sleeves 85 is substantially the same as the inside diameter of T-fitting 80.

A pair of hydraulic rams or plungers 87 are mounted for reciprocation in sleeves 85. These plungers are activated by suitable well known means, such as hydraulic pistons, to move them toward each other at the same controlled speed. Throughout the major portion of their lengths the rams have a diameter just sufficiently smaller than the internal diameter of sleeves 85 and T-fitting 80 to permit their sliding therein.

At the inner ends of each of the rams 87, portions 88 of reduced diameter are provided, and sharp shoulders 89 connect these portions with the remainder of the rams. The extreme ends of the rams are preferably slightly tapered as shown.

A tubular blank W of fluorocarbon polymer sheet is placed in the T-fitting so as to be substantially centrally located with respect to neck portion 82. However, slight misalignment is not important for the rams 87 will properly center the blank at the beginning of the pressing operation.

A slug 90 formed of any suitable incompressible, flowable, low melting point metal, and preferably one which will melt above 212° and in the order of 260° to 270° F., is placed within the tubular blank W. A typical metal is an alloy of lead and bismuth which melts within the above range of temperatures. Preferably, the diameter of the slug is as large as possible, while still permitting easy insertion of the slug into the tubular blank.

As will be apparent by reference to the drawing, work piece W has tapered ends so that the length of the work piece on one side is greater than on the other. In other words, the two ends of the blank are not square or do not lie in a plane which is perpendicular to the axis of the blank, but rather form an angle with respect thereto. The thickness of the sheet material forming the blank, however, is substantially uniform throughout.

The angle which the tapered ends make with the axis thereof will depend upon a number of factors such as the diameter and height of the neck portion 82 of T-fitting 80, the thickness of the sheet material from which the blank is formed, and the like.

The cylindrical slug 90 is tapered at each end in the same manner as the tubular blank, the angle of taper being substantially the same as that of the blank.

The volume of slug 90 appreciably exceeds the volume of the neck portion 82 of T-fitting 80, and is such that during the drawing operation the neck portion will be filled with the slug or filler material, as well as the body portion or main passage of the fitting.

Both the tubular blank W and the slug 90 are placed in the T-fitting with the longest side of each facing toward the neck portion 82, as shown.

After the blank and slug have been assembled in the T-fitting as shown in FIG. 4, the plungers 87 are moved into the T-fitting 80 and the upper portion of shoulders 89 engage the ends of the blank at its longest side, and the ends 88 of reduced diameter of the punches engage the ends of the slug 90 at its longest side. Continued inward movement of the plungers 87 causes the blank W and the slug 90 to flow into neck portion 82 of T-fitting 80. Inward movement of the plungers is continued until the blank, in the neck portion, reaches the position indicated in the drawing by the dot and dash line. At this point ends of the blank in the body portion 81 of fitting 82 should be substantially square or perpendicular to the axis of the blank.

Thereafter, the plungers are withdrawn, the T-fitting separated from sleeves 85, and slug 90 removed.

Since the blank preferably is heated to temperatures above 475° F. during pressing, the slug 90 is in molten condition and flows from the T-fitting when the plungers 87 are removed. However, if the operation is carried out at ambient temperatures, the slug can be removed by subsequently heating the T-fitting to a temperature sufficiently high to render the slug in molten condition.

If the blank is heated during the drawing operation, it preferably is quenched and then tempered as previously described to about ambient temperature before removing the plungers. In such case it will be necessary to reheat the T-fitting to remove the slug 90.

By making the blank of sufficient length, the ends thereof at the end of the pressing operation will extend beyond the ends of the body portion of the T-fitting. These ends of the blank can be flared so as to cover the exterior surface of flanges 84. Similarly, the cupped portion of the blank extending across the exterior end of neck portion 82 of the fitting can be cut and flared to cover the exterior surface of flange 83. Thus, there is produced a T-fitting completely lined with fluorocarbon polymer sheet material. Such a T-fitting is particularly useful in systems handling corrosive chemicals and the like.

The operation illustrated in FIG. 5 is generally similar to that shown in FIG. 4. In the drawing there is shown a metal T-fitting 100 having a cylindrical body portion 101 and a cylindrical neck or branch portion 102 of substantially the same inside diameter as the body portion. The exterior ends of the neck and body portions are provided with flanges 103 and 104, respectively.

Axially aligned at each end of the cylindrical body portion are a pair of sleeves 105, each having a flange 106 which abuts on a flange 104 of the T-fitting. The sleeves may be secured to the T-fitting by any suitable means, such as bolts, not shown. The inside diameter of the sleeves 105 is substantially the same as the inside diameter of T-fitting 100.

A pair of hydraulic rams or plungers 107 are mounted for reciprocation in sleeves 105. These plungers are activated by suitable well known means, such as hydraulic pistons, to move them toward each other at the same controlled speed. The inner ends of each of the rams 107 are squared and the edges thereof are preferably slightly tapered as shown.

A tubular blank W of fluorocarbon polymer sheet is placed in the T-fitting so as to be substantially centrally located with respect to the neck portion 102. A slug 108 formed of any suitable incompressible, flowable, low melting point metal, and preferably one which melts in the range from about 260°–270° F., is placed within the tubular blank W.

Figure 6:
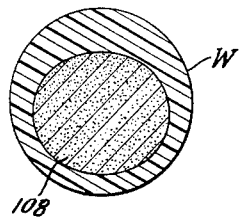
FIGURE 6 is an enlarged cross section of the tubular sheet of variable thickness illustrated in FIG. 5.

Referring particularly to FIG. 6, it will be seen that tubular blank W of fluorocarbon polymer sheet is not of uniform thickness throughout, but that a portion of the sheet of which it is comprised is thicker than the remainder of the sheet.

The volume of the slug 108 exceeds the volume of the neck portion 102 of T-fitting 100, and is such that during the drawing operation the neck or branch portion will be filled with the slug or filler material, as well as the body portion or main passage of the fitting.

The tubular blank W is inserted in the body portion of the T-fitting 100 so that the portion of the wall thereof of greatest thickness faces toward the neck portion 102, as shown.

After the blank and slug have been assembled in the T-fitting as shown in FIG. 5, the plungers 107 are moved into the T-fitting 100 and the inner ends thereof engage the ends of blank W. Continued inward movement of the plungers 107 causes the blank W and the slug 108 to flow into the neck portion 102 of T-fitting 100. Inward movement of the plungers is continued until the blank, in the neck portion, reaches the position indicated in the drawing by the dot and dash line. At this point of the operation the wall thickness of the deep pressed blank is substantially uniform at all points.

The plungers are withdrawn, the T-fitting separated from the sleeves 105, and slug 108 removed. Heating, quenching and tempering of the blank as described with respect to FIG. 4 can be carried out if desired.

By making the blank of sufficient length, the exterior faces of flanges 103 and 104 can be protected by fluorocarbon polymer sheet as described in connection with FIG. 4.

As many changes can be made in carrying out the above methods without departing from the spirit and scope of the invention, it is intended that all matter contained in the above description or shown in the accompanying drawings shall be interpreted as illustrative and not in any limiting sense.

What is claimed is:

1. A method for deep forming fluorocarbon polymer sheet which comprises supporting a fluorocarbon polymer sheet in a die having a recessed portion with said sheet extending across the mouth of said recessed portion, and applying pressure to the surface of said sheet in a direction substantially normal to the mouth of said recessed portion of said die while simultaneously applying pressure to the edge of said sheet to flow said sheet into said recessed portion of said die.

2. The method according to claim 1 in which said fluorocarbon polymer comprises polytetrafluoroethylene.

3. The method according to claim 1 in which said sheet material is at a temperature in the range between about 475° and 625° F. during forming thereof and is rapidly cooled to a temperature below about 100° F. prior to being removed from said die.

4. The method according to claim 1 in which said sheet is substantially flat.

5. The method according to claim 1 in which said sheet is in seamless tubular form.

6. The method according to claim 1 in which fluid pressure is applied to said sheet.

7. The method according to claim 1 in which fluid pressure is applied to the edge of said sheet and a combination of mechanical pressure and fluid pressure is applied to the surface of said sheet.

8. A method of deep drawing fluorocarbon polymer sheet which comprises closely supporting the periphery of a substantially flat sheet of fluorocarbon polymer between opposing faces of a die having a recessed portion in a face thereof with the central portion of said sheet extending across the mouth of said recessed portion of said die, and applying pressure to the surface of said sheet in a direction substantially normal to the mouth of said opening while simultaneously applying pressure to the edge of said sheet to flow said sheet inwardly between said opposing die faces, the central portion of said sheet flowing into said recessed portion of said die.

9. The method according to claim 8 in which said fluorocarbon polymer comprises polytetrafluoroethylene.

10. The method according to claim 8 in which said sheet material is at a temperature in the range between about 475° and 625° F. during drawing thereof and is rapidly cooled to a temperature below about 100° F. prior to being removed from said die.

11. The method according to claim 8 in which fluid pressure is applied to said sheet.

12. The method according to claim 8 in which fluid pressure is applied to the edge of said sheet and a combination of mechanical pressure and fluid pressure is applied to the surface of said sheet.

13. a method for deep forming a seamless tubular blank of fluorocarbon sheet which comprises supporting said tubular blank in a die having a substantially cylindrical portion which closely surrounds said tubular blank and a branch recessed portion opening on said cylindrical portion of said die, and applying opposing endwise pressure to the ends of said tubular blank and internal pressure within said tubular blank to flow a portion of said sheet into said recessed portion of said die.

14. The method of claim 13 in which said fluorocarbon polymer comprises polytetrafluoroethylene.

15. The method of claim 13 in which said sheet material is at a temperature in the range between about 475° and 625° F. during drawing thereof and is rapidly cooled to a temperature below about 100° F. prior to being removed from said die.

16. The method of claim 13 in which fluid pressure is applied to said sheet.

17. The method according to claim 13 in which mechanical pressure is applied endwise and fluid pressure is applied internally of said tubular blank.

18. The method according to claim 13 in which the ends of said tubular blank are tapered inwardly forming an angle with the axis of said blank, the longer side of said blank being adjacent said branch recessed portion of said die.

19. The method according to claim 13 in which the sheet comprising said tubular blank is of greater thickness throughout the length thereof on the side adjacent said branch recessed portion of said die than the remainder of said blank.

20. The method of providing a fitting having a main passage and a branch passage opening on said main passage, such as a T-fitting, with a seamless lining of fluorocarbon polymer sheet which comprises inserting a seamless tubular blank of fluorocarbon polymer sheet in the main passage of said fitting with a portion of the surface of said tubular blank extending completely across the mouth of the branch of said fitting, the outer diameter of said tubular blank being only slightly smaller than the inside diameter of said main passage of said fitting, and applying opposing endwise pressure to the ends of said tubular blank and internal pressure within said tubular blank to flow said sheet into said branch.

21. The method according to claim 20 in which said fluorocarbon polymer comprises polytetrafluoroethylene.

22. The method according to claim 20 in which said sheet material is at a temperature in the range between about 475° and 625° F. during drawing thereof and is rapidly cooled to a temperature below about 100° F.

23. The method according to claim 20 in which fluid pressure is applied to said sheet.

24. The method according to claim 20 in which the ends of said tubular blank are tapered inwardly forming an angle with the axis of said blank, the longer side of said blank being adjacent said branch recessed portion of said die.

25. The method according to claim 20 in which the sheet comprising said tubular blank is of greater thickness throughout the length thereof on the side adjacent said branch than the remainder of said blank.

26. The method according to claim 20 in which the outer ends of said fitting including the outer end of said branch have annular flanges, the initial length of said tubular blank is such that the ends of the lining of the resulting lined fitting in said main passage and said branch thereof extend beyond the flanged ends of said fitting, and the ends of said lining are flared to cover at least a portion of the exterior faces of said flanges with fluorocarbon polymer sheet.

References Cited in the file of this patent

UNITED STATES PATENTS

| | | |
|---|---|---|
| 2,270,187 | Dulmage | Jan. 13, 1942 |
| 2,494,273 | Wigal | Jan. 10, 1950 |
| 2,551,393 | Pinger | May 1, 1951 |
| 2,649,067 | Kranenberg | Aug. 18, 1953 |
| 2,670,224 | Markl | Feb. 23, 1954 |
| 2,789,934 | Busbach | Apr. 23, 1957 |
| 2,826,784 | Pratt | Mar. 18, 1958 |
| 2,854,694 | Mumford | Oct. 7, 1958 |
| 2,995,781 | Sipler | Aug. 15, 1961 |
| 3,013,310 | Foster et al. | Dec. 19, 1961 |
| 3,021,571 | Jackson et al. | Feb. 20, 1962 |

FOREIGN PATENTS

| | | |
|---|---|---|
| 90,052 | Netherlands | Jan. 15, 1959 |